United States Patent [19]
Okita et al.

[11] Patent Number: 5,920,674
[45] Date of Patent: Jul. 6, 1999

[54] VIDEO SIGNAL EDITING APPARATUS

[75] Inventors: Nobuaki Okita; Shunsuke Ishida, both of Higashiosaka, Japan

[73] Assignee: Xecoo Corporation, Higashiosaka, Japan

[21] Appl. No.: 08/864,807

[22] Filed: May 29, 1997

[30]  Foreign Application Priority Data

May 29, 1996  [JP]  Japan ................................... 8-158964

[51] Int. Cl.[6] .............................. H04N 5/93; G11B 27/00
[52] U.S. Cl. .............................. 386/52; 386/55; 348/588; 345/328
[58] Field of Search ..................................... 386/4, 52, 55, 386/61, 64; 360/13; 345/328; 348/584, 588, 589, 598, 715, 722

[56]  References Cited

U.S. PATENT DOCUMENTS

| | | | |
|---|---|---|---|
| 4,467,371 | 8/1984 | Kobayashi et al. | 360/14.3 |
| 4,612,569 | 9/1986 | Ichinose | 358/22 |
| 4,685,003 | 8/1987 | Westland | 360/14.1 |

*Primary Examiner*—Wendy Garber
*Assistant Examiner*—Christopher Onuaku
*Attorney, Agent, or Firm*—Graham & James LLP

[57]  ABSTRACT

A video signal editing apparatus has a simplified configuration and still can edit a number of video signals in an efficient way. The video signal editing apparatus performs an editing operation by using video signal combined to display a plurality of moving scenes on a single screen of a video display. The apparatus includes a first signal path 40 transmitting all video signals, a signal extracting device for extracting a desired video signal out of the transmitted video signals for a scene selected from the displayed moving scenes, a second path having a pair of image memories for storing the extracted video signal, a storage device for storing editing data concerning the timing, the mode and the duration of time of switching moving scenes, a CUE signal and other editing data in synchronism with the time base of the video signals and a data controller for reproducing and transferring editing data. The data representing the extracted video signal stored in the image memory is read out at the same time when a video signal which is to be displayed after the extracted video signal in the same field in which the extracted video signal is displayed, is read out of the image memory.

12 Claims, 4 Drawing Sheets

VIDEO SIGNAL EDITING APPARATUS

BACKGROUND OF THE INVENTION

1. Field of the Invention

The present invention relates to a video signal editing apparatus and, more particularly, it relates to a video signal editing apparatus for carrying out an editing operation by using video signals which are combined to display a plurality of separate, independent moving scenes on a single screen.

2. Description of the Prior Art

Conventionally, in a process of editing a plurality of video signals to produce a single video signal derived from such video signals, a plurality of video tape recorders (hereinafter referred to as VTRs) must be used and the number of VTRs must be equal to the number of video signals supplied for the editing operation. When one or more than one of the plurality of video signals are selected for switching or synthesizing scenes, the video signals are transmitted through a time base collector (hereinafter referred to as a TBC) to synchronize the signals before carrying out the switching or synthesizing operation.

However, a known editing apparatus adapted to perform editing operations requires the use of a number of VTRs for receiving video signals and a number of monitors for previewing images to be edited, with the number of VTRs and monitors having to correspond to the number of video signals to be edited. As a result, such a system is very bulky and costly. In addition, because such a system includes so many components, it is difficult to find a space for installing such a bulky system. Furthermore, such an editing apparatus is often structurally very complicated and costly since the video signals to be edited have to be synchronized by using a number of TBCs that comprise costly image memories. Still further, the editing operation using such an apparatus is often inefficient and time consuming because the VTRs have to be started to run well before the desired scenes appear on the respective screens of the monitors in order to synchronize the video signals to be edited.

SUMMARY OF THE INVENTION

To overcome the problems described above, the preferred embodiments of the present invention provide a video signal editing apparatus that is structurally simple and yet capable of efficiently editing a plurality of video signals.

According to the preferred embodiments of the present invention, a video signal editing apparatus is adapted to carry out an editing operation by using video signals which are combined to display a plurality of separate, independent moving scenes on a single screen of a video display and comprises a first signal path for transmitting all video signals, a signal extractor for extracting a desired video signal out of the transmitted video signals for a scene selected from the displayed moving scenes, a second path having an image memory for storing the extracted video signal, a storage device for storing editing data concerning the timing, the mode and the duration of time of switching moving scenes, a CUE signal and other editing data in synchronism with the time base of the video signals and a data control device for reproducing and transferring editing data, wherein the data representing the extracted video signal stored in the image memory is read out at the same time when a video signal which is to be displayed after the extracted video signal in the same field in which the extracted video signal is displayed, is read out of the image memory. More specifically, the video signals preferably include at least one video signal for a blank scene and the data representing the extracted video signal stored in the image memory is read out when the video signal for a blank scene is fed to the image memory in order to combine the video signal read out of the image memory and the video signals transmitted through the first path in a desired manner. With such an arrangement, the scenes to be edited are displayed with the edited scene on a common single video display so that the editing apparatus can be structurally simplified and the edited scene can be reconfirmed easily to improve the efficiency of editing operations.

Preferably, the video signals are combined such that the blank scene is to be located in the tail scan field of the video display. Then, the operations of writing a video signal in the image memory and reading a video signal from the image memory can be completed while video signals for a single field are being supplied.

Still preferably, a converter for converting an analog signal into a digital signal is connected upstream relative to the image memory. Then, video signals that are analog signals can be stored in the image memory for editing without any problem.

Alternatively, a converter for converting a digital signal into an analog signal may be connected downstream relative to the image memory. Then, both the non-edited scenes and the edited scene can be viewed on a monitor even if the output signal is fed to an apparatus adapted to process only analog video signals.

In a video signal editing apparatus according to the preferred embodiments of the present invention, the image memory may be replaced by a pair of image memories connected in parallel to make it possible to switch or combine the video signals read out of the image memories. Then, the scene switching effect of the editing operation can be viewed on a real time basis.

In a video signal editing apparatus according to the preferred embodiments of the present invention, preferably, the first path can optionally be cut via a switch or similar switching device. Then, since only the video signal produced by the image memory is provided, the edited scene, or the result of the current editing operation, can be viewed on the display screen of the image display for reconfirmation without disturbances or other non-extracted, non-selected scenes from the video signals being displayed.

A video signal editing apparatus according to the preferred embodiments of the present invention may additionally comprise a scene enlarging device for enlarging the scene corresponding to the video signal read out of the image memory. Then, the edited scene, or the result of the current editing operation, can be viewed with ease because it can be enlarged to a desired size within the display screen of the image display.

A video signal editing apparatus according to the preferred embodiments of the present invention may additionally comprise a scene selecting device which has scene selection controls is preferably arranged in correspondence to the scene arrangement on the screen of the image display. Then, the operation of selecting one of a plurality of moving scenes does not need to be visually confirmed and the editor can keep on watching the display screen of the image display for the scene selecting operation to eliminate any delay and/or error in giving out instructions to the operator.

A video signal editing apparatus according to the preferred embodiments of the present invention may be incorporated into a video tape recorder as a built-in component thereof. Then, no connection cable needs to be additionally used for an editing operation so that the risk of picking up noises on the part of connection cable can be totally eliminated.

Alternatively, a video signal editing apparatus according to the preferred embodiments of the present invention may be incorporated into a computer as a built-in component thereof. Then, video signals produced by synthesis or combining signals in the computer may be edited and the edited data may be further manipulated and modified in the computer to give rise to various effects on the output video signal.

These and other elements, features, and advantages of the preferred embodiments of the present invention will be apparent from the following detailed description of the preferred embodiments of the present invention, as illustrated in the accompanying drawings.

DETAILED DESCRIPTION OF PREFERRED EMBODIMENTS

Figure 1:
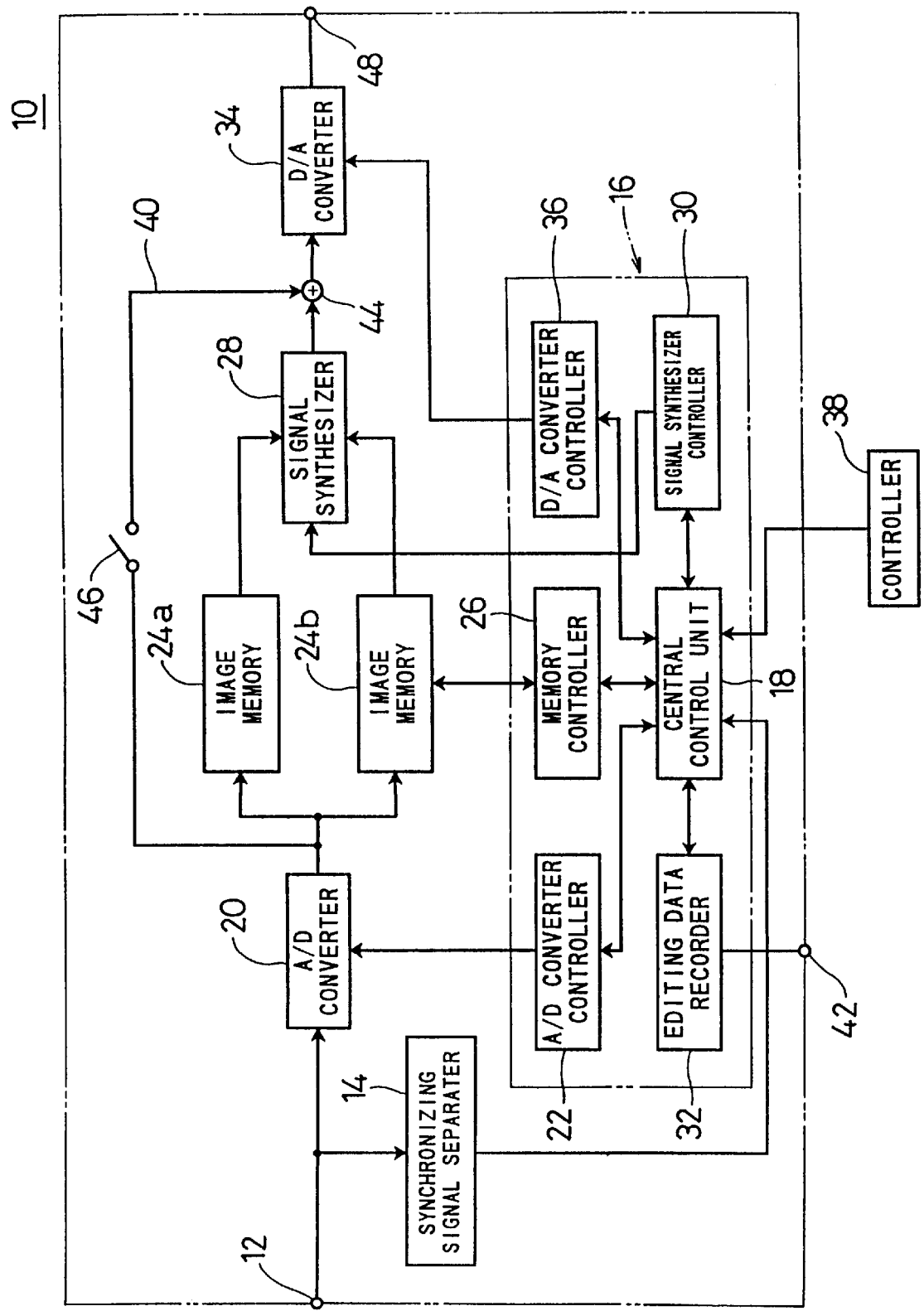
FIG. 1 is a schematic block diagram of a preferred embodiment of the invention.
Figure 2:
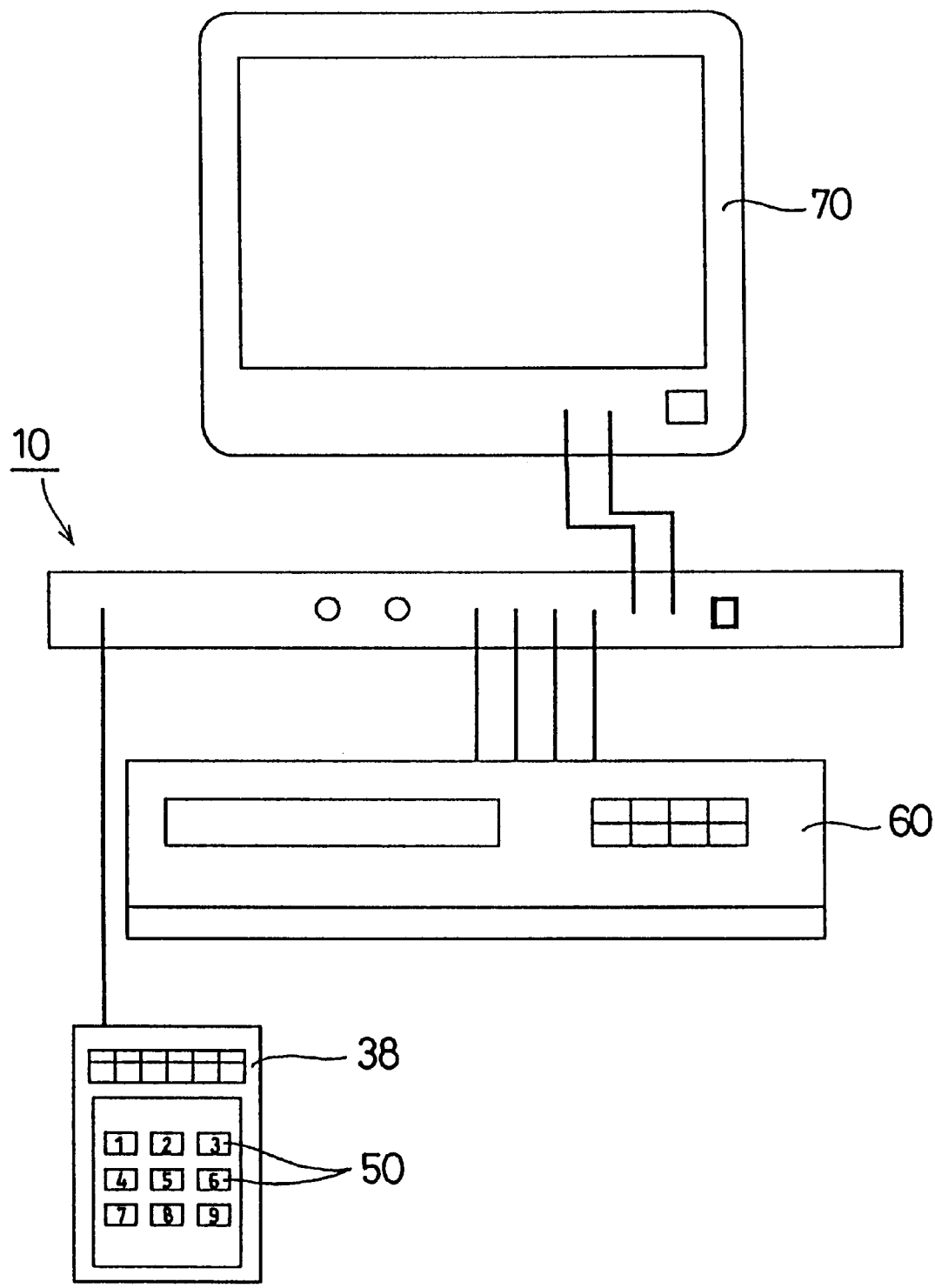
FIG. 2 is a schematic view of the preferred embodiment of FIG. 1 and its peripherals.

Now, the present invention will be described by referring to the accompanying drawings that illustrate non-limitatively preferred embodiments of video signal editing apparatus according to the present invention. FIG. 1 is a schematic block diagram of a preferred embodiment of the invention and FIG. 2 is a schematic view of the preferred embodiment of FIG. 1 and its peripherals.

Figure 3:
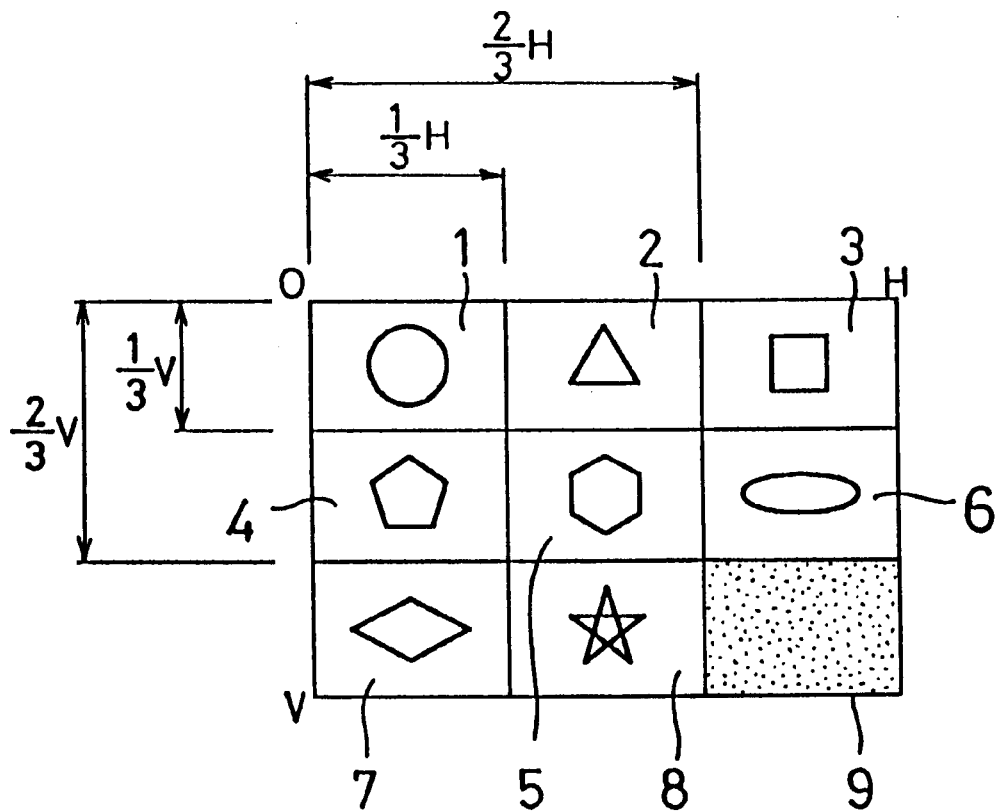
FIG. 3 is a schematic illustration of the scenes corresponding to the video signals and arranged on the display screen of the image display of the preferred embodiment of FIG. 1.

The video signal editing apparatus 10 preferably comprises a video signal input section 12, which receives video signals to be edited from a VTR 60. As shown in FIG. 3, the video signals are combined together and preferably include signals for eight separate, independent moving scenes 1 through 8 displayed in the corresponding scan fields and a video signal for a blank scene 9 preferably having a size which is substantially the same as the moving scenes 1 through 8 and displayed in the tail scan field, or the right bottom scan field, of the monitor screen 70 of an image display. Note that, while the display screen is divided into nine sections for nine video signals in this preferred embodiment, the number of divided sections is not limited to nine but the display screen may alternatively be divided by some other appropriate number such as four or twelve. The divided sections of the display screen are not necessarily equally sized. Note that FIG. 3 is a schematic illustration of the scenes corresponding to the video signals and arranged on the display screen of the image display of the preferred embodiment of FIG. 1. The video signals entered into the video signal input section 12 are then fed to a synchronizing signal separator 14, where the synchronizing signals including the horizontal synchronizing signals, the vertical synchronizing signals and color burst signals are separated from the remaining component signals of the video signals. The synchronizing signals extracted by the synchronizing signal separator 14 are then transmitted to a central control unit 18 arranged in a control section 16 for centrally controlling the operations of different components of the video signal editing apparatus 10. The control section 16 includes an A/D converter controller 22 for controlling the operation of an A/D converter 20, a memory controller 26 for generating addresses for and controlling the video signal writing and reading operations of image memories 24a and 24b and a signal synthesizer controller 30 for controlling the operations of signal synthesizer 28 that switches and/or combines the video signals produced from the image memories 24a and 24b.

The control section 16 also includes an editing data recorder 32 for recording and reproducing the editing data produced during the editing operation and a D/A converter controller 36 for controlling the operation of a D/A converter 34. The central control unit 18 is connected to the A/D converter controller 22, the memory controller 26, the signal synthesizer controller 30, the editing data recorder 32 and the D/C converter controller 36 to control their respective operations. The central control unit 18 is also connected to a controller 38 which operates as a scene selecting device.

The synchronizing signals separated by the synchronizing signal separator 14 are used as reference signals in the operation of controlling the plurality of controllers of the control section 16. The video signals from which the synchronizing signals have been separated are then sent to the A/D converter 20, which A/D converter 20 converts the analog video signals it receives into digital signals and outputs them as digital video signals. The A/D converter 20 is controlled by the A/D converter controller 22 to digitize the input video signals in such a way that the number of horizontal pixels for the video signals obtained by a single horizontal scan is equal to a predetermined number of horizontal pixels H and then outputs the produced digital video signals.

If the video signal input section 12 always receives digital video signals, the A/D converter 20 and the A/D converter controller 22 may be omitted because there is no need for digitizing video signals.

The digital video signals produced by the A/D converter 20 are then fed to the first and second image memories 24a and 24b connected in parallel with each other and a bypass transmission path 40 for transmitting all the digital video signals in the video signal editing apparatus.

The first image memory 24a is designed to store the digital video signals fed to it, although it does not carry out a data writing operation for all the digital video signals it receives from the A/D converter 20. More specifically, the first image memory 24a stores only the video signals contained in and selected from the supplied digital video signals. Note that the operation of the first image memory 24a is controlled by the memory controller 26 as will be described below.

The memory controller 26 generates a horizontal address and a vertical address to be used for the operation of writing a video signal in or that of reading a video signal out of the image memory 24a. After generating the address for the video signal selected by the controller 38 for a moving scene which has been selected to be displayed, the memory controller 26 specifies a writing operation to be performed by the image memory 24a. More specifically, a writing operation to be carried out by the first image memory 24a is specified preferably only when a selected one of the video signals for the moving scenes to be displayed on the monitor screen is entered into the video signal input section 12. In other words, any other video signals for moving scenes that are not selected and fed to the first image memory 24a will not be written into it.

Figure 4:
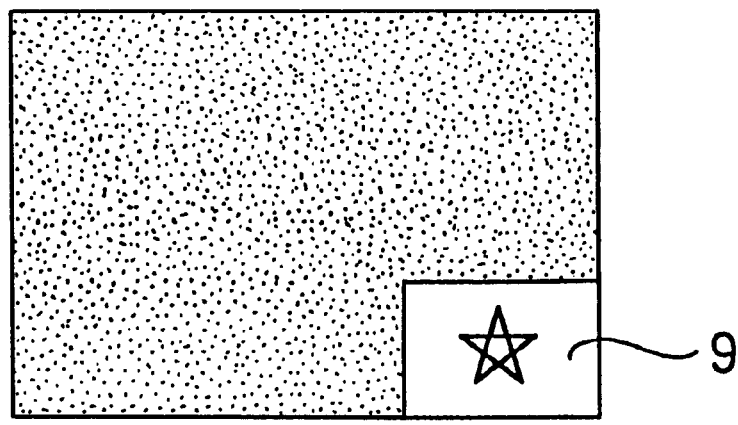
FIG. 4 is a schematic illustration of the positional arrangement of the scene corresponding to the video signal read out of the image memory.

After generating the address for the video signal for the blank scene 9 to be displayed, the memory controller 26 specifies a reading operation to be performed by the image memory 24a. More specifically, when the moving scene 8 is selected, for example, the first image memory 24a stores the video signal for the scene having a horizontal address for the horizontal span between ⅓H and ⅔H and a vertical address for the vertical span between ⅔V and V, whereas it reads out the video signal for the scene having a horizontal address for the horizontal span between ⅔H and H and a vertical address for the vertical span between ⅔V and V. Then, the scene of the video signal produced by the first image memory 24a is displayed in the field of the blank scene 9, while all the remaining moving scenes are erased as shown in FIG. 4. Note that FIG. 4 is a schematic illustration of the positional arrangement of the scene corresponding to the video signal read out of the image memory.

As in the case of the first image memory 24a, a selected one of the video signals fed from the A/D converter 20 is processed for the second image memory 24b according to the procedures described above referring to the first image memory 24a.

In this preferred embodiment, the image memories 24a and 24b may be SRAMs that are popular and commercially available. This is because, while known image memories to be used for video signals are typically dual port memories that are LSIs designed for video signals and comprising a port for signal writing and a port for signal reading in order to carry out a writing operation at an address where a reading operation is currently conducted, the image memories 24a and 24b of this preferred embodiment are free from any interference between the address for writing operation and the address for reading operation.

The video signals produced by the first and second image memories 24a and 24b are then fed to the signal synthesizer 28, which signal synthesizer 28 switches the video signal from the first image memory 24a and the video signal from the second image memory 24b or combines them with a desired area ratio of the scenes produced by the respective video signals to produce an output signal.

The signal synthesizer 28 is controlled by the signal synthesizer controller 30 for the operation of switching the video signal from the first image memory 24a and the video signal from the second image memory 24b or combining the signals on a real time basis according to the editing signal concerning the timing, the mode and the duration of time of switching moving scenes, a CUE signal and other editing data fed from the controller 36.

The editing signal fed from the controller 36 may be stored, whenever necessary, in the editing data recorder 32 in synchronism with the time base of the video signals at hand. In addition to the operation of storing editing data in the above described manner, the editing data recorder 32 reproduces the stored data also in synchronism with the time base of the video signals at hand and transfers the data to the memory controller 26. Thus, the edited scenes obtained as a result of an editing operation can be reproduced for viewing for the purpose of reconfirmation without temporarily storing them on a magnetic tape or some other recording medium. The editing data recorder 32 includes an editing data output section 42 for producing the editing data outside the video signal editing apparatus 10 so that they may be externally stored and/or further transferred. Therefore, the editing data may not necessarily be stored in the editing data recorder 32 and may be externally stored in the form of signals stored on the magnetic tape that stores the video signals used for the editing operation.

Figure 5:
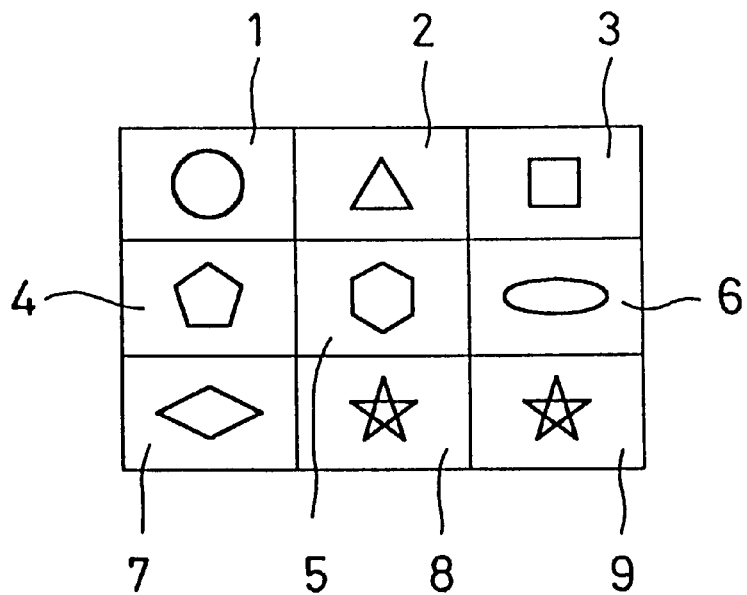
FIG. 5 is a schematic illustration of the screen of the image display showing the positional arrangement of the multiple scene of an output video signal of a video synthesizer.
Figure 6:
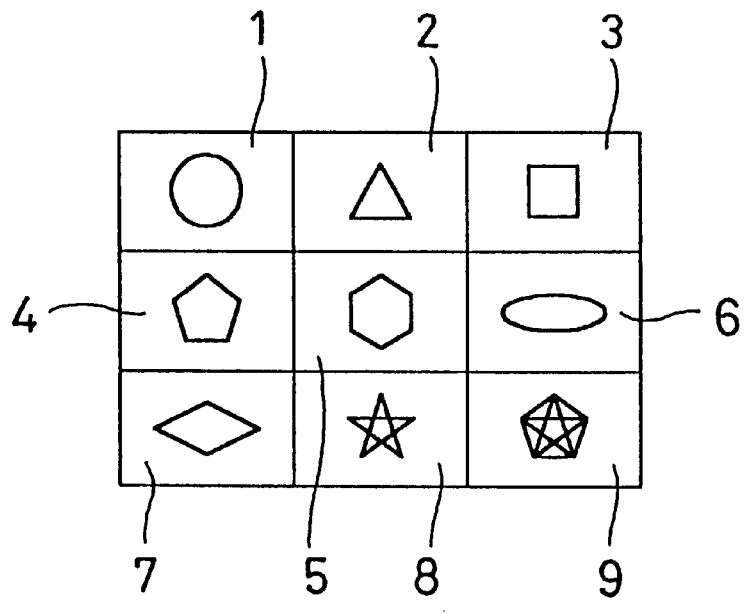
FIG. 6 is a schematic illustration of the screen of the image display showing the positional arrangement of the multiple scene of another output video signal of a video synthesizer.

The video signal produced from the signal synthesizer 28 is then further combined with the video signals transmitted through the bypass transmission path 40 via another synthesizer 44. The bypass transmission path 40 transmits all the digital video signals passing therethrough without specifically selecting any of them. Thus, the video signal produced by the synthesizer 44 provides a multiple scene image obtained by combining a number of different scenes as shown in FIG. 5. The bypass transmission path 40 is provided with a switch 46 that can be used to cut or reconnect the path if necessary. Note that FIG. 5 is a schematic illustration of the screen of the image display showing the positional arrangement of the multiple scene of an output video signal of the synthesizer 44 and FIG. 6 is a schematic illustration of the screen of the image display showing the positional arrangement of the multiple scene of another output video signal of the synthesizer.

The video signal produced by the synthesizer 44 is fed to the D/A converter 34, which D/A converter 34 converts the signal back into an analog video signal under the control of the D/A converter controller 36. The analog video signal is then fed to a video signal output section 48. Note that the video signal fed to the video signal output section is also fed to a video monitor 70 that provides a visual scene of the video signal. Thus, the editor can view both the scenes to be edited and the edited scene on the same monitor screen 70 without requiring the use of an additional monitor screen for viewing the edited scene for reconfirmation to simplify the procedures for confirming both the editing operation and the result of the editing operation.

Note that the positional arrangement of the scene selection buttons 50 of the controller 38 preferably exactly corresponds to the arrangement of the scenes on the multiple screen of the video monitor 70 so that the editor or the operator does not have to confirm or ensure the correspondence between the scene to be manipulated and the button 50 to be used for that scene. Also note that, while the controller 38 is located close to the operator as a scene selection device in the above preferred embodiment, a touch panel may alternatively be arranged on the video monitor 70 so that scenes may be switched simply by touching the scene to be selected on the monitor screen.

While video signals are preferably recorded on a magnetic tape (not shown) and reproduced therefrom via a VTR 60 in the above description, the device for feeding video signals is not limited thereto so long as moving scenes are combined and displayed on the monitor screen for the video signals. Therefore, a scene reducing/synthesizing apparatus that is typically incorporated in an anti-theft security system may be used to directly provide video signals. Alternatively, video signals may be combined via a computer and fed to the video signal editing apparatus.

Additionally, while a magnetic tape is used for storing video signals and reproducing them from the tape via a VTR 60 in order to feed the video signal editing apparatus 10 with the video signals in the above preferred embodiment, the VTR 60 and the video signal editing apparatus 10 being connected by way of a connection cable, the video signal editing apparatus 10 may alternatively be arranged within the VTR 60 to eliminate the cumbersome operation of connecting the video signal editing apparatus 10 and the VTR 60 via a connection cable for each editing operation and consequently reduce the overall time required for the editing operation. With such an arrangement, the video signal editing apparatus 10 is protected against cable noise that can enter it to degrade the video signals being manipulated.

Furthermore, the video signal editing apparatus 10 may alternatively be arranged within a computer. With such an arrangement, any of the video signal data stored in the computer for supplying video signals can be edited via the video signal editing apparatus 10. Then, the edited data may be processed by the computer to give a variety of image manipulation effects on the video signals to enhance the level of video signal editing operation.

When a video signal editing apparatus according to the preferred embodiments of the present invention is incorporated into a computer, the image memories 24a and 24b and the editing data recorder 32 may not be required because some of the memory devices of the computer may be used in place of the image memories 24a and 24b and editing data may be stored in a memory device such as a floppy disc or a hard disc arranged in the computer.

While the present invention is described in detail by referring to the accompanying drawings that illustrate a preferred embodiment of the invention, the above description by no means limits the spirit and the scope of the invention, which are limited only by the affixed claims.

What is claimed is:

1. A video signal editing apparatus for editing video images by combining a plurality of video signals to display a plurality of independent moving scenes on a single screen of a video display device, the video signal editing apparatus comprising:
    a first signal path for transmitting all of the plurality of video signals;
    a video signal extracting device arranged to extract a desired video signal out of the plurality of video signals which desired video signal corresponds to a scene selected from displayed moving scenes;
    a second path having an image memory for storing an extracted video signal;
    a storage device for storing editing data concerning a timing, a mode and a duration of time of switching moving scenes, a CUE signal and other editing data in synchronism with a time base of the plurality of video signals; and
    a data control device for reproducing and transferring editing data; wherein
        the extracted video signal stored in the image memory is read out of the image memory when a video signal to be displayed in a field which is the same as a field in which the extracted video signal is displayed is read out.

2. A video signal editing apparatus according to claim 1, wherein the video signals include at least a video signal for a blank scene; and
    the data stored in the image memory is read out when a video signal for producing the blank scene is fed to the image memory in order to combine the video signal read out of the image memory and the video signals transmitted through the first path.

3. A video signal editing apparatus according to claim 2, wherein the video signals are combined such that the blank scene is to be located in a tail scan field of the video display device.

4. A video signal editing apparatus according to claim 1, wherein a converter for converting an analog signal into a digital signal is connected upstream relative to said image memory.

5. A video signal editing apparatus according to claim 1, wherein a converter for converting a digital signal into an analog signal is connected downstream relative to said image memory.

6. A video signal editing apparatus according to claim 1, wherein said image memory is replaced by a pair of image memories connected in parallel to selectively switch or combine the video signals read out of the image memories.

7. A video signal editing apparatus according to claim 1, wherein the first path is adapted to selectively cut.

8. A video signal editing apparatus according to claim 1, further comprising a scene enlarging device for enlarging a scene corresponding to the video signal read out of the image memory.

9. A video signal editing apparatus according to claim 2, further comprising a scene selecting device having scene selecting members arranged in correspondence to a scene arrangement on a screen of said image display device.

10. A video signal editing apparatus according to claim 1, wherein the video signal editing apparatus is incorporated into a video tape recorder as a built-in component thereof.

11. A video signal editing apparatus according to claim 1, wherein the video signal editing apparatus is incorporated into a computer as a built-in component thereof.

12. A video signal editing apparatus for editing video images by combining a plurality of video signals to display a plurality of independent moving scenes on a single screen of a video display device, the video signal editing apparatus comprising:
    a video signal input section for receiving a plurality of video signals to be edited;
    a selecting means for selecting a moving scene from a plurality of displayed moving scenes;
    a video signal extracting device arranged to extract a desired video signal which corresponds to a scene selected from the displayed moving scenes;
    an image memory for storing an extracted video signal;
    an editing data storage device for storing editing data concerning a timing, a mode and a duration of time of switching moving scenes, a CUE signal and other editing data in synchronism with a time base of the plurality of video signals;
    a data control device for reproducing and transferring editing data; and
    a bypass transmission path for transmitting all of the plurality of video signals received in the video signal input section; wherein
        the extracted video signal stored in the image memory is read out of the image memory when a video signal to be displayed in a field which is the same as a field in which the extracted video signal is displayed is read out.

* * * * *

UNITED STATES PATENT AND TRADEMARK OFFICE
CERTIFICATE OF CORRECTION

PATENT NO. : 5,920,674
DATED : July 6, 1999
INVENTOR(S) : Nobuaki Okita, et al.

It is certified that error appears in the above-identified patent and that said Letters Patent is hereby corrected as shown below:

On the title page, item
[73] Assignee: Xecoo Corporation and Daifuki Co., Ltd., both of Japan Signed and Sealed this Fourteenth Day of March, 2000

Attest:

Q. TODD DICKINSON

Attesting Officer

Commissioner of Patents and Trademarks